UNITED STATES PATENT OFFICE 2,027,890

INDIGOID DYESTUFFS AND PROCESS OF MAKING SAME

Ernst Stöcklin, Binningen, near Basel, Switzerland, assignor to "Society of Chemical Industry in Basle", Basel, Switzerland No Drawing. Application September 10, 1934, Serial No. 743,487. In Switzerland September 22, 1933

13 Claims. (Cl. 260—53)

This invention relates to the manufacture of new indigoid vat-dyestuffs from hydroxythionaphthenes of the general formula

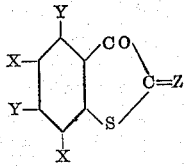

wherein X represents halogen, Y alkyl, and Z a reactive group, such as O, anil, 2H, NOH, halogen or H and COOH, by condensing the hydroxythionaphthene with an indigoid component; the indigoid dyestuff produced may be subsequently halogenated.

Hydroxythionaphthenes of the above formula and reactive 2-derivatives thereof are, for example, 4,6-dimethyl-5-chloro-7-bromo-3 - hydroxythionaphthene, 4,6-dimethyl-5,7-dichloro-3-hydroxythionaphthene, 4,6-dimethyl - 5 - bromo-7-chloro - 3 - hydroxythionaphthene, 4,6-dimethyl-5,7-dibromo-3-hydroxythionaphthene, the 2-anils, such as for example 2-(para-dimethyl-amino-)anils and 2-(para-hydroxy-anils-), 2-carboxylic acids, 2-oximes, 2-dihalides of these compounds, as well as 4,6-dimethyl-5,7-dihalogenthionaphthenequinones obtainable from the above 2-anils by saponification with mineral acids.

For making the indigoid dyestuffs suitable indigoid components are, for example, hydroxythionaphthenes of the benzene, naphthalene, anthracene and anthraquinone series; further indoxyls and isatines of the benzene, naphthalene and anthracene series; further phenols, naphthols, hydroxyanthracenes and hydroxycarbazoles, and finally also o-diketones of the isocyclic series and the products of these hydroxythionaphthenes, phenols, hydroxycarbazoles and o-diketones substituted in the aryl-nuclei, i. e. in the benzene, naphthalene, anthracene and anthraquinone nuclei, by halogen groups, such as, for instance, chlorine or bromine, alkyl-groups, alkoxy-groups, such as, for example, methoxy or ethoxy-groups, wherein only one of several substituents, which may be similar or different, can be present. The hydroxythionaphthenes and the indoxyls can be condensed as such with the indigoid components, or they can be used in the form of their reactive 2-derivatives, for example as 2-anils [2-(p-dimethylamino anils) or 2-(hydroxyanils)], or as 2-carboxylic acids or as 2-oximes or as 2-dihalides or as thionaphthenequinones. Also the isatines can be condensed as such, the oxygen atom of the isatines standing in β-position participating in the condensation, or they can be used in the form of their reactive α-derivatives, such as, for example, isatine-α-halides. As is known, acenaphthenequinones, phenanthrenequinones, and aceanthrenequinones belong for example to the o-diketones of the isocyclic series.

The condensation of the 3-hydroxythionaphthenes of the above general formula with the cited indigoid components takes place preferably by heating the mixture in a solvent or suspension which, if desired, can also act as condensing agent. Such solvents or suspensions are, for instance, water, alcohols, benzene, chlorobenzene, tetrachlorethane, glacial acetic acid and sulfuric acid.

The dyestuffs obtained of the general formula

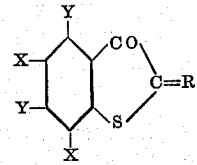

wherein X represents halogen, Y alkyl and R the radical of an indigoid component, are pink, scarlet-red, red-violet, violet, and violet-blue to blue powders, dissolving in concentrated sulfuric acid to green to blue-green solutions, and dyeing cotton from yellow, orange, red to violet vats pink, scarlet, red, red-violet, violet, and violet-blue to blue tints.

The new dyestuffs are particularly suitable for dyeing and printing vegetable and animal fibres, for instance, cotton, wool and silk, and are characterized by high coloring power, excellent purity, and very good properties of fastness; they can be converted into their leuco-ester salts by known methods, and after-halogenated with halogen or agents yielding halogen by known methods, for example by reaction with chlorine or bromine in the presence of suspensions or solvents, such as, for example, water, nitrobenzene, trichlorobenzene, chlorobenzene or sulfuric acid.

The 3-hydroxythionaphthenes of the first mentioned general formula and their reactive 2-derivatives may be made by any known method; for example, to make 4.6-dimethyl-5,7-dichloro-3-hydroxythionaphthene the following procedure may be adopted:—

From 1-amino-2,4-dimethyl-6-benzenesulfonic acid there is made by diazotization and reaction of the diazo-compound with cuprous chloride the 1-chloro-2,4-dimethyl-6-benzene - sulfonic acid, which by the action of phosphorus pentachloride, is converted into the 1-chloro-2,4-dimethyl-6-benzene-sulfochloride, which boils under 6 mm. pressure at 160–161° C. and melts at 61–62° C. This sulfochloride is now reduced in usual manner, and the 1-chloro-2,4-dimethyl-6-thiophenol thus formed, which boils at 109–110° C. under 7 mm. pressure, is condensed in alkaline solution with monochloracetic acid to the 1-chloro- 2,4-dimethyl-6-phenylthioglycollic acid melting at 117° C. The 1-bromo-2,4-dimethyl-6-phenylthioglycollic acid, obtainable in analogous manner, melts at 114° C. By treating the 1-chloro-2,4-dimethyl-6-phenylthioglycollic acid in, for example, chlorobenzene with sulfuryl chloride there is obtained the 1,3-dichloro-2,4-dimethyl-6-phenylthioglycollic acid of melting point 155° C., whereas the 1-bromo-3-chloro-2,4-dimethyl-6-phenylthioglycollic acid of melting point 161° C. is obtained in analogous manner from the 1-bromo-2,4-dimethyl-6-phenylthioglycollic acid. If the 1-chloro- or the 1-bromo-2,4-dimethyl-6-phenylthioglycollic acids are treated with bromine in similar manner, there is obtained the 1-chloro-3-bromo-2,4-dimethyl-6-phenylthioglycollic acid melting at 154° C., or the 1,3-dibromo-2,4-dimethyl-6-phenylthioglycollic acid of melting point 169° C. By treating these 1,3-dihalogen-2,4-dimethyl-6-phenylthioglycollic acids with phosphorus trichloride and aluminium chloride, or with chlorosulfonic acid, there are produced the corresponding hydroxythionaphthenes, such as, for example, the 4,6-dimethyl-5,7-dichloro-3-hydroxythionaphthene of melting point 224° C., the 4,6-dimethyl-5-chloro-7-bromo-3-hydroxythionaphthene of melting point 231° C., the 4,6-dimethyl-5-bromo-7-chloro-3-hydroxythionaphthene of melting point 227° C., and the 4,6-dimethyl-5,7-dibromo-3-hydroxynaphthene melting above 270° C.

From the hydroxythionaphthenes having the foregoing general formula the reactive 2-derivatives, for instance the 2-anils such as, for example, the 2-(para-dimethylamino-)anils, the 2-oximes, the 2-halides, are made in known manner by the action of nitroso-compounds, nitrous acid or halogen; from the 2-anils by treatment with sulfuric acid the 4,6-dialkyl-5,7-dihalogenthionaphthenequinones are obtained. There is thus formed, for example, the 2-(para-dimethylamino-)anil of the 4,6-dimethyl-5,7-dichloro-3-hydroxythionaphthene of melting point 272° C. from 4,6-dimethyl-5,7-dichloro-3-hydroxythionaphthene by condensation with para-nitrosodimethylaniline, which product, when treated at 40° C. with sulfuric acid of 80 per cent. strength, is saponified to the 4,6-dimethyl-5,7-dichlorothionaphthenequinone of melting point 153° C.

The following examples illustrate the invention, the parts being by weight:—

*Example 1*

A mixture of 247 parts of 4,6-dimethyl-5,7-dichloro-3-hydroxythionaphthene and 282 parts of 2-(para-dimethylamino-)anil of 3-hydroxythionaphthene with 4000 parts of alcohol is heated to boiling. When condensation is complete the dyestuff is filtered, washed and dried. The new dyestuff of the formula

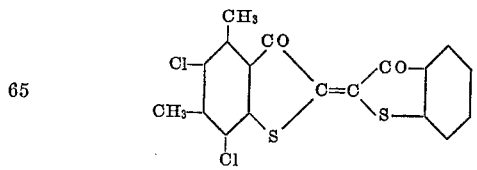

is a shining red powder, soluble in concentrated sulfuric acid to a green solution, and dyes cotton from a yellow vat pure pink tints of very good fastness.

The same dyestuff is obtained when 379 parts of 2-(para-dimethylamino-)anil of 4,6-dimethyl-5,7-dichloro-3-hydroxythionaphthene are condensed with 150 parts of 3-hydroxythionaphthene.

*Example 2*

247 parts of 4,6-dimethyl-5,7-dichloro-3-hydroxythionaphthene are dissolved in 2000 parts of chlorobenzene and the solution is mixed at 70° C. with a solution of 5,7-dibromisatin chloride, made from 305 parts of 5,7-dibromisatin and 250 parts of phosphorus pentachloride in chlorobenzene in the known manner. After stirring for a short time condensation is complete. Filtration, washing and drying follow, whereby the dyestuff of the formula

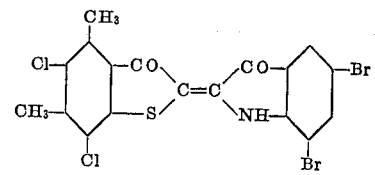

is obtained in the form of a dark violet powder soluble in concentrated sulfuric acid to a green solution and dyeing cotton in a yellow vat fast pure blue-violet tints.

If in this example 216 parts of 5,7-dichlorisatin are substituted for the 5,7-dibromisatin a dyestuff of similar properties is obtained.

Dyestuffs dyeing similar tints are obtained when substituting in this example 291.5 parts of 4,6-dimethyl-5-chloro-7-bromo-3-hydroxythionaphthene, or 291.5 parts of 4,6-dimethyl-5-bromo-7-chloro-3-hydroxythionaphthene, or 336 parts of 4,6-dimethyl-5,7-dibromo-3-hydroxythionaphthene for the 247 parts of 4,6-dimethyl-5,7-dichloro-3-hydroxythionaphthene.

If 247 parts of 4-methyl-5-chloro-7-methoxyisatin are used instead of the 5,7-dibromisatin there is obtained a dyestuff which dyes cotton pure blue very fast tints.

The same dyestuffs are obtained when using the equivalent quantities of the isatin-α-anilides instead of the isatine chlorides.

*Example 3*

A mixture of 247 parts of 4,6-dimethyl-5,7-dichloro-3-hydroxythionaphthene and 216 parts of 5,7-dichloroisatine is heated with 4000 parts of glacial acetic acid. When condensation is complete the dyestuff is filtered, washed and dried. The new dyestuff of the formula

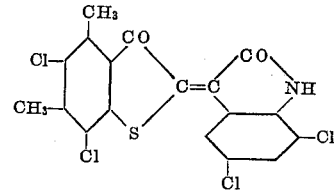

is a violet powder, soluble in concentrated sulfuric acid to a green solution, and dyes cotton from a yellow vat fast red-violet tints.

If 305 parts of 5,7-dibromisatine, or 247 parts of 4-methyl-5-chloro-7-methoxyisatine are used instead of the 5,7-dichloroisatine, there are obtained dyestuffs dyeing similar violet tints.

Similar dyestuffs are further obtained when substituting in this example 291.5 parts of 4,6-dimethyl-5-chloro-7-bromo-3-hydroxythionaphthene, or 291.5 parts of 4,6-dimethyl-5-bromo-7-chloro-3-hydroxythionaphthene, or 336 parts of 4,6-dimethyl-5,7-dibromo-3-hydroxythionaphthene for the 4,6-dimethyl-5,7-dichloro-3-hydroxythionaphthene.

Example 4

A mixture of 247 parts of 4,6-dimethyl-5,7-dichloro-3-hydroxythionaphthene and 182 parts of acenaphthenequinone is heated with 4000 parts of chlorobenzene. When condensation is complete the dyestuff is filtered, washed and dried. The new dyestuff of the formula

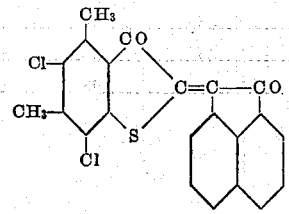

is a scarlet powder, soluble in concentrated sulfuric acid to a green solution, and dyes cotton from a violet vat scarlet tints.

Similar dyestuffs are obtained when substituting in this example, on the one hand, equivalent proportions of phenanthrenequinone or aceanthrenequinone for the acenaphthenequinone, and, on the other hand, equivalent proportions of 4,6-dimethyl-5-chloro-7-bromo-3-hydroxythionaphthene, or 4,6-dimethyl-5-bromo-7-chloro-3-hydroxythionaphthene, or 4,6-dimethyl-5,7-dibromo-3-hydroxythionaphthene for the 4,6-dimethyl-5,7-dichloro-3-hydroxythionaphthene.

Example 5

247 parts of 4,6-dimethyl-5,7-dichloro-3-hydroxythionaphthene are dissolved in 4000 parts of glacial acetic acid, and this solution treated in the cold with 320 parts of bromine. When formation of the reactive 4,6-dimethyl-5,7-dichloro-3-hydroxythionaphthene-2-dibromide is complete, there are added 194 parts of α-hydroxyanthracene, and the whole is stirred until the condensation is finished. The dyestuff is then filtered, washed and dried. The new dyestuff of the probable formula

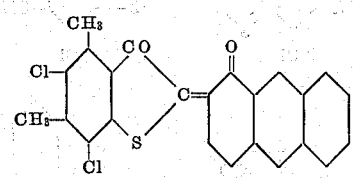

is a violet powder, soluble in concentrated sulfuric acid to a green-blue solution, and dyes cotton from a yellow vat violet tints.

The same dyestuff is obtained if there are used for the condensation 379 parts of 2-(para-dimethylamino-)anil of the 4,6-dimethyl-5,7-dichloro-3-hydroxythionaphthene instead of the α-dibromide of the 4,6-dimethyl-5,7-dichloro-3-hydroxythionaphthene.

Similar dyestuffs are obtained when substituting in this example, on the one hand, equivalent proportions of other reactive phenols, preferably naphthols, for the 4-chloro-α-naphthol, and, on the other hand, equivalent proportions of 4,6-dimethyl-5-chloro-7-bromo-3-hydroxythionaphthene, or 4,6-dimethyl-5-bromo-7-chloro-3-hydroxythionaphthene, or 4,6-dimethyl-5,7-dibromo-3-hydroxythionaphthene, for the 4,6-dimethyl-5,7-dichloro-3-hydroxythionaphthene or the α-dibromides of the corresponding 2-anils.

Example 6

421 parts of the dyestuff obtained by condensation of 247 parts of 4,6-dimethyl-5,7-dichloro-3-hydroxythionaphthene with 310 parts of 2-(para-dimethylamino-)anil of the 4,7-dimethyl-3-hydroxythionaphthene, are introduced into 4000 parts of concentrated sulfuric acid to which 144 parts of bromine have been added. After stirring for 10 hours at ordinary temperature the mixture is heated to 30° C. within 10 hours and then poured into water. The precipitated dyestuff is filtered, washed with water and dried. The new dyestuff of the formula

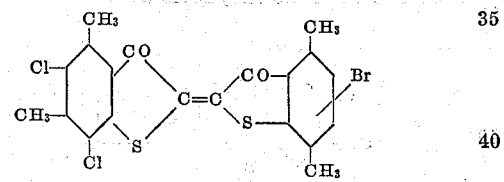

is a red powder, soluble in concentrated sulfuric acid to a green solution, and dyes cotton from a yellow vat fast red-violet tints.

The following table gives further examples for producing new valuable indigoid dyestuffs obtainable by the present invention from 4,6-dimethyl-5,7-dichloro-3-hydroxythionaphthene, or 4,6-dimethyl-5-chloro-7-bromo-3-hydroxythionaphthene, or 4,6-dimethyl-5-bromo-7-chloro-3-hydroxythionaphthene, or 4,6-dimethyl-5,7-dibromo-3-hydroxynaphthene:—

|  | 4,6-dimethyl-5,7-dichloro-3-hydroxythionaphthene and: | Color of the dyestuff | Color in conc. sulfuric acid | Color of the vat | Color of the dyed cotton |
|---|---|---|---|---|---|
| 1 | 2-(para-dimethylamino-) anil of the 5-chloro-7-methyl-3-hydroxythionaphthene. | Red-violet | Green | Green-yellow | Violet-red. |
| 2 | 2-(para-dimethylamino-) anil of the 5-methyl-6-chloro-3-hydroxythionaphthene. | Red | ---do--- | Yellow | Red. |
| 3 | 2-(para-dimethylamino-) anil of the 4-methyl-6-chloro-3-hydroxythionaphthene. | ---do--- | ---do--- | Brown-yellow | Pink. |
| 4 | 2-(para-dimethylamino-) anil of the 6-chloro-3-hydroxythionaphthene. | ---do--- | ---do--- | Yellow | Yellow-red. |
| 5 | 2-(para-dimethylamino-) anil of the 6-ethoxy-3-hydroxythionaphthene. | Brick red | ---do--- | Orange | Brick red. |
| 6 | 2-(para-dimethylamino-) anil of the 5,7-dibromo-3-hydroxythionaphthene. | Red-violet | ---do--- | Yellow | Red-violet. |
| 7 | 2-(para-dimethylamino-) anil of the 4,6-dimethyl-7-chloro-3-hydroxythionaphthene. | ---do--- | ---do--- | ---do--- | Violet. |
| 8 | 2-(para-dimethylamino-) anil of the 2,1-naphththioindoxyl. | Bordeaux | ---do--- | Orange | Bordeaux. |
| 9 | 2-(para-dimethylamino,) anil of the 1,2-naphththioindoxyl. | Mauve | ---do--- | ---do--- | Mauve. |
| 10 | 2-(para-dimethylamino-) anil of the 1-chloro-2,3-naphththioindoxyl. | Blue | ---do--- | ---do--- | Blue-violet. |
| 11 | 2-(para-dimethylamino-) anil of the 2,3-naphththioindoxyl. | Violet | ---do--- | Orange-brown | Do. |
| 12 | 2-(para-dimethylamino-) anil of the 4,7-dimethyl-3-hydroxythionaphthene. | Red | ---do--- | Yellow | Red. |
| 13 | 2-(para-dimethylamino-) anil of the 4,7-dimethyl-5-chloro-3-hydroxythionaphthene. | ---do--- | ---do--- | ---do--- | Red-violet. |

| | 4,6-dimethyl-5,7-dichloro-3-hydroxythionaphthene and: | Color of the dyestuff | Color in conc. sulfuric acid | Color of the vat | Color of the dyed cotton |
|---|---|---|---|---|---|
| 14 | 2-(para-dimethylamino-) anil of the 6-ethoxy-3-hydroxy-thionaphthene. | Red | Green | Orange | Scarlet. |
| 15 | 2-(para-dimethylamino-) anil of the 4-methyl-6-chloro-3-hydroxythionaphthene. | Red-violet | ...do | Brown-yellow | Pink. |
| 16 | 2-(para-dimethylamino-) anil of the 5-methyl-6-chloro-3-hydroxythionaphthene. | ...do | ...do | Yellow | Red-violet. |
| 17 | 2-(para-dimethylamino-) anil of the 5-chloro-7-methyl-3-hydroxythionaphthene. | Violet | ...do | ...do | Violet. |
| 18 | 2-(para-dimethylamino-) anil of the 6-chloro-3-hydroxythionaphthene. | Red | ...do | ...do | Red. |
| 19 | 2-(para-dimethylamino-) anil of the 4,7-dimethyl-5-chloro-3-hydroxythionaphthene. | Violet | ...do | ...do | Red-violet. |
| | 4,6-dimethyl-5-chloro-7-bromo-3-hydroxythionaphthene and: | | | | |
| 20 | 2-(para-dimethylamino-) anil of the 4-methyl-6-chloro-3-hydroxythionaphthene. | ...do | ...do | ...do | Pink. |
| 21 | 2-(para-dimethylamino-) anil of the 5-chloro-7-methyl-3-hydroxythionaphthene. | ...do | ...do | ...do | Red-violet. |
| 22 | 2-(para-dimethylamino-) anil of the 6-ethoxy-3-hydroxy-thionaphthene. | Red | ...do | Orange | Scarlet. |
| 23 | 2-(para-dimethylamino-) anil of the 5-methyl-6-chloro-3-hydroxythionaphthene. | Violet | ...do | Yellow | Red-violet. |
| 24 | 2-(para-dimethylamino-) anil of the 4,7-dimethyl-5-chloro-3-hydroxythionaphthene. | Red-violet | ...do | ...do | Do. |
| 25 | 2-(para-dimethylamino-) anil of the 4-methyl-6-chloro-3-hydroxythionaphthene. | Violet | ...do | ...do | Pink. |
| 26 | 2-(para-dimethylamino-) anil of the 5-chloro-7-methyl-3-hydroxythionapthene | ...do | ...do | ...do | Red-violet. |
| 27 | 2-(para-dimethylamino-) anil of the 5-methyl-6-chloro-3-hydroxythionaphthene. | ...do | ...do | ...do | Do. |
| 28 | 2-(para-dimethylamino-) anil of the 4,7-dimethyl-5-chloro-3-hydroxythionaphthene. | Red-violet | ...do | ...do | Do. |
| 29 | 2-(para-dimethylamino-) anil of the 6-ethoxy-3-hydroxythionaphthene. | Red | ...do | Orange | Scarlet. |

The dyestuffs cited in the above table correspond to the following formulas:—

(1) [chemical structure]

(2) [chemical structure]

(3) [chemical structure]

(4) [chemical structure]

(5) [chemical structure]

(6) [chemical structure]

(7) [chemical structure]

(8) [chemical structure]

(9) [chemical structure]

(10) [chemical structure]

(11) 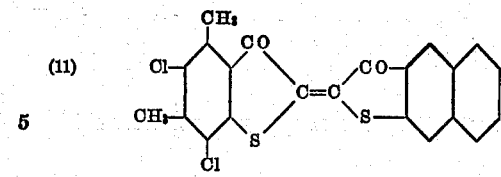
(12) 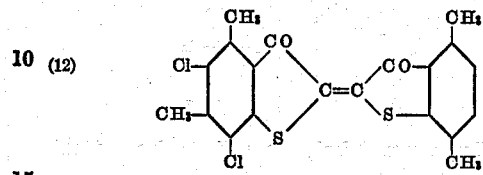
(13) 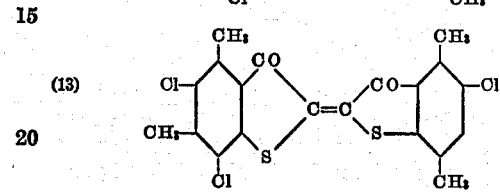
(14) 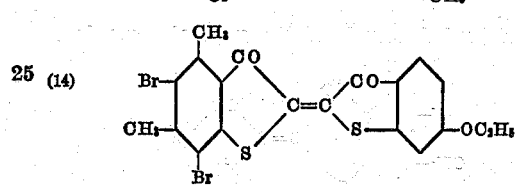
(15) 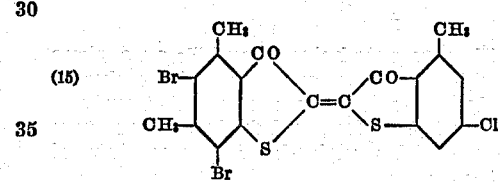
(16) 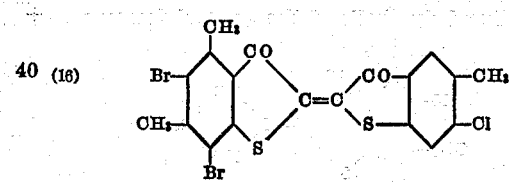
(17) 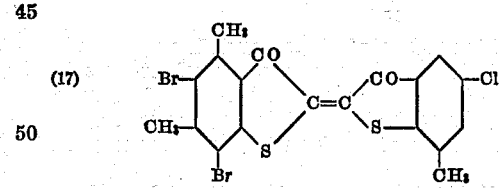
(18) 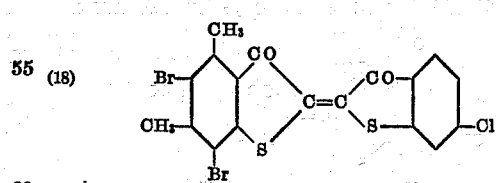
(19) 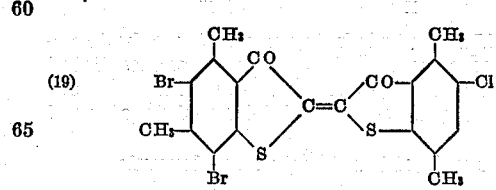
(20) 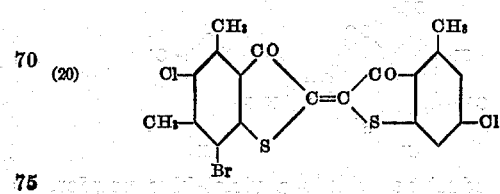
(21) 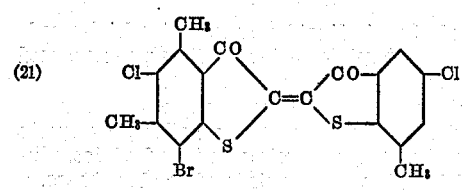
(22) 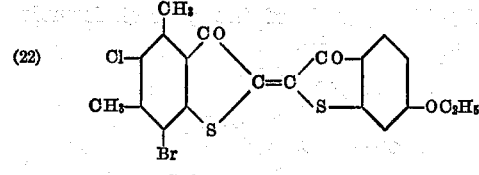
(23) 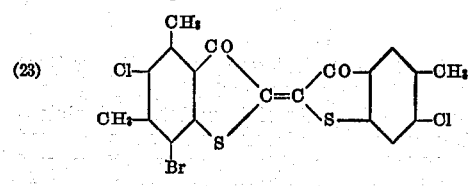
(24) 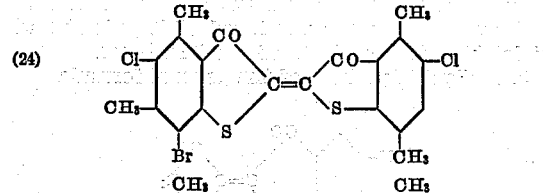
(25) 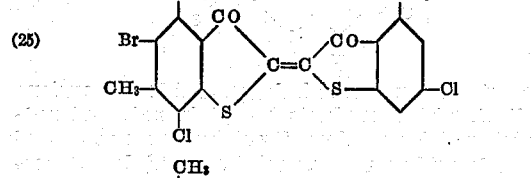
(26) 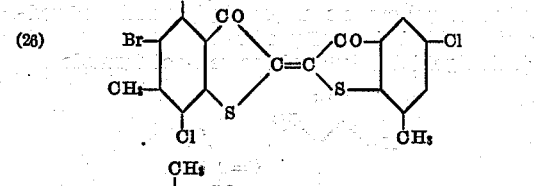
(27) 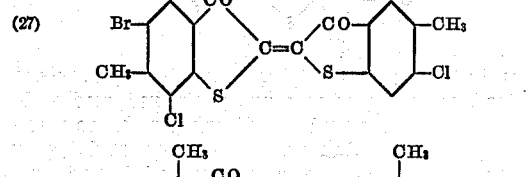
(28) 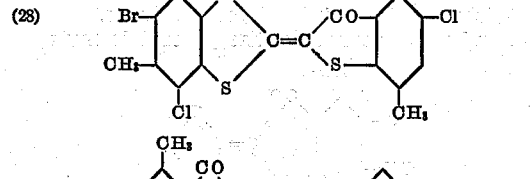
(29) 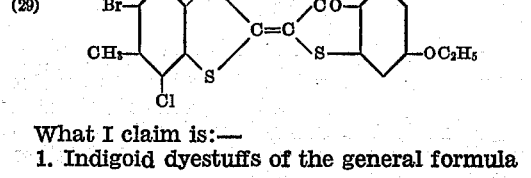
What I claim is:—
1. Indigoid dyestuffs of the general formula
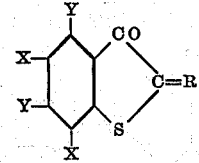
wherein X represents halogen, Y methyl and R the radical of an indigoid component, which products are scarlet, pink, red, red-violet, violet, and violet-blue to blue powders, dissolving in concentrated sulfuric acid to green, to blue-green solutions, and dyeing cotton from a yellow, orange to red to violet vat scarlet, pink, red, red-violet, violet and violet-blue to blue tints of good fastness.

2. Indigoid dyestuffs of the general formula

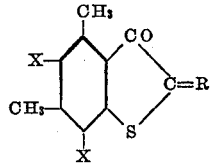

wherein X represents halogen and R the radical of an indigoid component, which products are scarlet, pink, red, red-violet, violet, and violet-blue to blue powders, dissolving in concentrated sulfuric acid to green, to blue-green solutions, and dyeing cotton from a yellow, orange to red to violet vat scarlet, pink, red, red-violet, violet and violet-blue to blue tints of good fastness.

3. Indigoid dyestuffs of the general formula

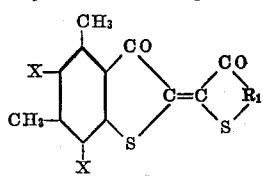

wherein X represents halogen and $R_1$ an arylene radical, which products are pink, red, and red-violet to violet powders, dissolving in concentrated sulfuric acid to a green solution, and dyeing cotton from a yellow to orange vat pink, red, and red-violet to violet tints of good fastness.

4. Indigoid dyestuffs of the general formula

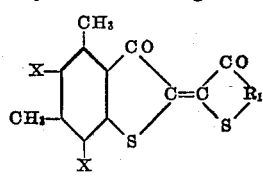

wherein X represents halogen and $R_1$ a phenylene radical, which products are pink, red and red-violet to violet powders, dissolving in concentrated sulfuric acid to a green solution, and dyeing cotton from a yellow to orange vat pink, red, and red-violet to violet tints of good fastness.

5. Indigoid dyestuffs of the general formula

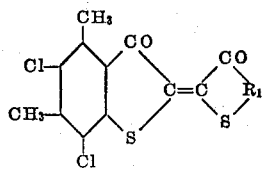

wherein $R_1$ represents a phenylene radical, which products are pink, red, and red-violet to violet powders, dissolving in concentrated sulfuric acid to a green solution, and dyeing cotton from a yellow to orange vat pink, red, and red-violet to violet tints of good fastness.

6. The indigoid dyestuff of the formula

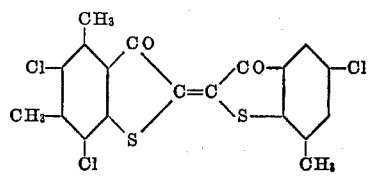

which product represents a red-violet powder, dissolving in concentrated sulfuric acid to a green solution, and dyeing cotton from a yellow vat very pure red-violet tints of good fastness.

7. Indigoid dyestuffs of the general formula

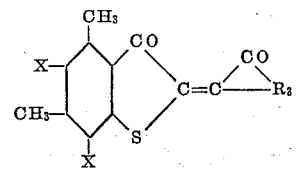

wherein X represents halogen and $R_3$ the radical

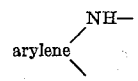

which products are violet, violet-blue to blue powders, dissolving in concentrated sulfuric acid to a green solution, and dyeing cotton from a yellow vat violet, violet-blue to blue tints of good fastness.

8. Indigoid dyestuffs of the general formula

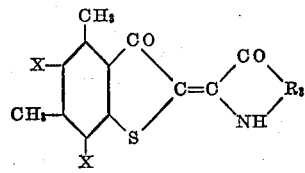

wherein X represents halogen and $R_3$ an arylene radical, which products are violet, violet-blue to blue powders, dissolving in concentrated sulfuric acid to a green solution, and dyeing cotton from a yellow vat violet, violet-blue to blue tints of good fastness.

9. Indigoid dyestuffs of the general formula

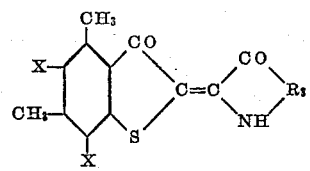

wherein X represents halogen and $R_3$ a phenylene radical, which products are violet, violet-blue to blue powders, dissolving in concentrated sulfuric acid to a green solution, and dyeing cotton from a yellow vat violet, violet-blue to blue tints of good fastness.

10. Indigoid dyestuffs of the general formula

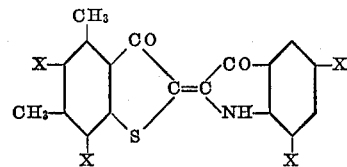

wherein X represents halogen, which products are violet-blue powders, dissolving in concentrated sulfuric acid to a green solution, and dyeing cotton from a yellow vat violet-blue tints of good fastness.

11. The indigoid dyestuff of the formula

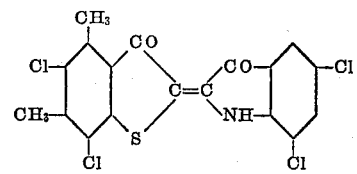

which product represents a violet-blue powder, dissolving in concentrated sulfuric acid to a green solution, and dyeing cotton from a yellow vat violet-blue tints of good fastness.

12. Indigoid dyestuffs of the general formula

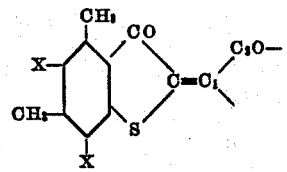

wherein X represents halogen and the carbon pair $C_1 C_2$ belongs to a carbocyclic ring system which products are scarlet, orange, red to violet powders, dissolving in concentrated sulfuric acid to green to blue solutions, and dyeing cotton from a yellow, orange, red to violet vat scarlet, orange red to violet tints.

13. The indigoid dyestuff of the formula

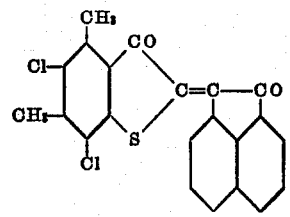

which product represents a scarlet powder, dissolving in concentrated sulfuric acid to a green solution, and dyeing cotton from a violet vat scarlet tints.

ERNST STÖCKLIN.